United States Patent
Kannonji

[19]

[11] Patent Number: 6,119,068
[45] Date of Patent: Sep. 12, 2000

[54] REAR-END COLLISION ALARMING DEVICE AND METHOD LINKED TO SPEED CONTROL DEVICE OF A VEHICLE

[76] Inventor: Michihiro Kannonji, 4-16, Sunamichi-cho 2-cho, Sakai-shi, Osaka, Japan

[21] Appl. No.: 08/998,017

[22] Filed: Dec. 24, 1997

[30] Foreign Application Priority Data

Dec. 27, 1996 [JP] Japan ..................... 8-350630
Jan. 20, 1997 [JP] Japan ..................... 9-041307

[51] Int. Cl.[7] .................... G06G 7/78; G06F 17/10
[52] U.S. Cl. ................... 701/301; 701/96; 701/300; 340/901; 340/903; 340/435; 340/436; 342/455; 180/271
[58] Field of Search ................. 701/301, 93, 96, 701/300, 302; 340/435, 436, 438, 439, 903, 904, 901; 180/167, 169, 271; 342/70, 455, 71, 109, 450, 454, 461

[56] References Cited

U.S. PATENT DOCUMENTS

| | | | |
|---|---|---|---|
| 5,053,979 | 10/1991 | Etoh | 701/96 |
| 5,235,316 | 8/1993 | Qualizza | 340/436 |
| 5,357,438 | 10/1994 | Davidian | 701/301 |
| 5,396,426 | 3/1995 | Hibino et al. | 701/96 |
| 5,594,412 | 1/1997 | Matsumoto | 701/301 |
| 5,631,639 | 5/1997 | Hibino et al. | 701/301 |
| 5,754,099 | 5/1998 | Nishimura et al. | 701/301 |
| 5,969,969 | 10/1999 | Ejiri et al. | 701/41 |

*Primary Examiner*—Jacques H. Louis-Jacques
*Attorney, Agent, or Firm*—McDermott, Will & Emery

[57] ABSTRACT

An rear-end collision alarming device issuing an alarm for preventing a rear-end collision against a vehicle running ahead determines whether a gas pedal is operated when it is determined that a subject vehicle approaches the vehicle running ahead. If the gas pedal is not operated, this means that a driver does not react to the approach. Therefore, the device notify the driver of the approach to the vehicle running ahead through an alarm sound or light.

6 Claims, 10 Drawing Sheets

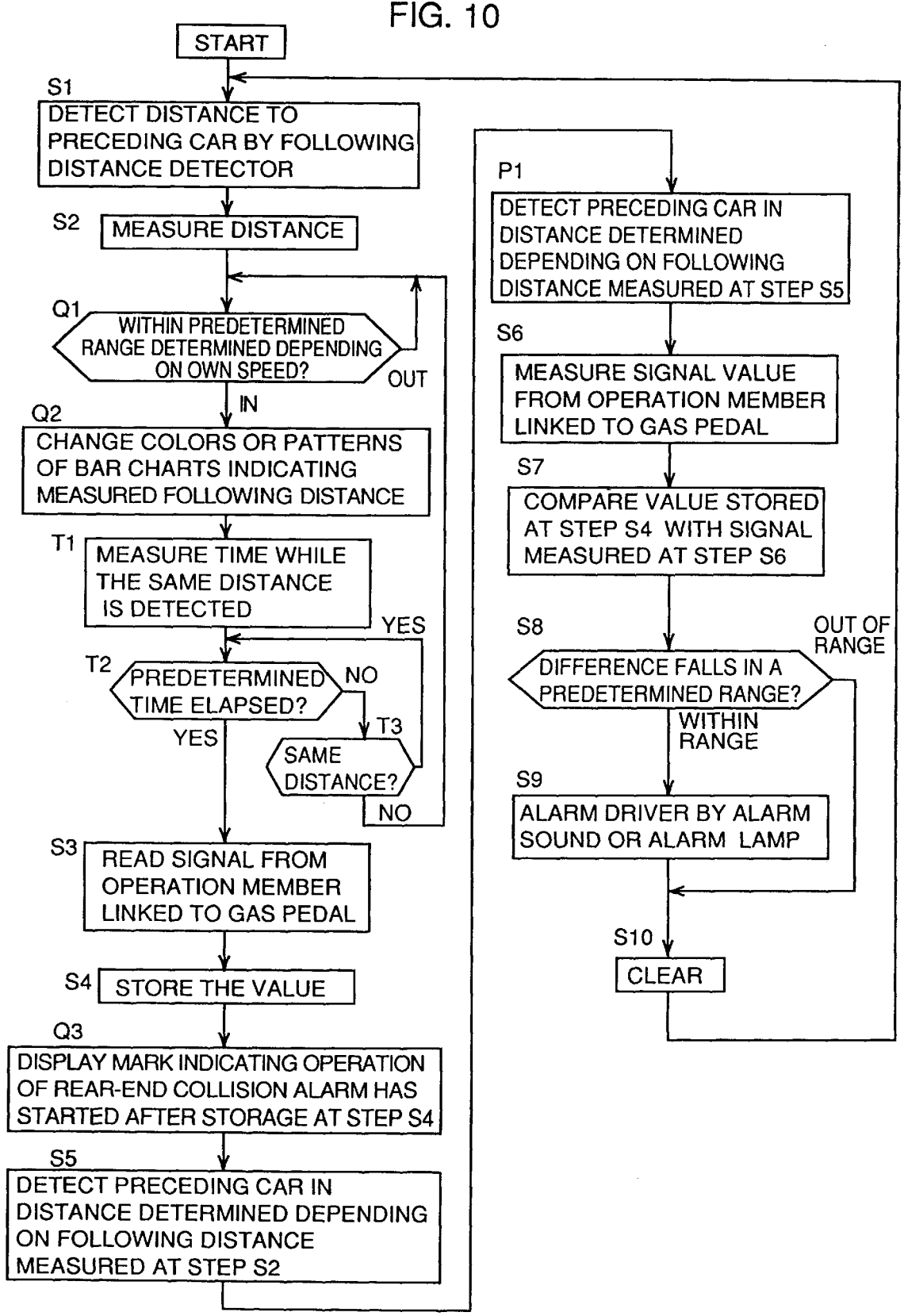

REAR-END COLLISION ALARMING DEVICE AND METHOD LINKED TO SPEED CONTROL DEVICE OF A VEHICLE

BACKGROUND OF THE INVENTION

1. Field of the Invention

The present invention relates to a technique for preventing a rear-end collision between vehicles such as automobiles, which move independently of each other. In particular, the invention relates to rear-end collision alarming device and method, in which a distance from a subject vehicle to a preceding vehicle is measured, and the measured distance is utilized for preventing a rear-end collision of the subject vehicle against the preceding vehicle.

2. Description of the Background Art

Vehicles such as automobiles move on roads independently of each other. Therefore, there is a possibility of an accident such as a contact between vehicles. Particularly on expressways or the like, rear-end collisions happen frequently, and result in serious situations due to high running speeds of vehicles.

A major cause of the rear-end collision is an excessively short distance between automobiles. Accordingly, various devices for preventing the collision have been proposed. The device in the prior art generally includes a distance measuring device which is mounted on a vehicle for measuring a distance, a relative speed or the like between the subject and preceding vehicles, and determines the possibility of rear-end collision based on the detected distance, relative speed or the like.

When the distance between the subject and preceding vehicles decreases, a driver generally releases a gas pedal and/or depresses a brake pedal to decrease a running speed and increase the following distance to the vehicle in front. When the distance increases to a safe value, the driver increases the speed to a former proper value. In this manner, each driver operates the vehicle properly in accordance with a variation in distance between the subject and preceding vehicles so that a rear-end collision can be prevented, and safe driving of a plurality of vehicles is ensured.

Accordingly, one of major causes of the rear-end collision is that drivers did not properly perform a series of foregoing operations. Thus, the rear-end collision occurs when a driver does not perform a series of foregoing operations at all, or perform the operations with proper timing. More specifically, the collision occurs when a driver looked aside or fell asleep.

However, such a device has not yet become widely available that can accurately detect the possible facts that a series of necessary operations is not performed at all or performed with a delay due to looking-aside or a doze during driving, and can reliably prevent the rear-end collision. It is preferable to prevent the rear-end collision without requiring a driver's operation, but it is also desirable to notify a driver of a possibility of the rear-end collision for requesting an appropriate operation by the driver.

Accordingly, an object of the invention is to provide a rear-end collision alarming device which issues to a driver in a subject vehicle an alarm relating to a following distance to a vehicle in front, and/or applies forcedly a brake in some cases for preventing the rear-end collision, when the subject vehicle approaches the preceding vehicle and the driver does not react on it to keep a safe distance, as well as a method of displaying the following distance.

Another object of the invention is to provide a rear-end collision alarming device which determines whether a driver in a subject vehicle does a series of operations to be performed or not when the subject vehicle approaches the preceding vehicle, and can issue an alarm for preventing a rear-end collision, and/or can apply forcedly a brake in some cases for preventing the rear-end collision as well as a method of displaying the following distance.

SUMMARY OF THE INVENTION

In view of the above objects, the invention provides a rear-end collision alarming device including a following distance detector; a memory unit for storing an output signal value obtained from an operation member linked to a speed control device in a subject vehicle in response to detection of the distance between the subject vehicle and a preceding vehicle by the following distance detector; and an alarming device being responsive to subsequent detection of the following distance by the following distance detector to determine a possibility of a rear-end collision for issuing an alarm based on the subsequently detected following distance, the output signal value obtained from the operation member and the signal value stored in the memory unit.

The invention does not employ a structure for preventing the rear-end collision based on a relative speed between the subject and preceding vehicles, but employs a structure which determines whether a series of operations to be performed by the driver is performed or not based on the output signal obtained from the operation member linked to the speed control device in the subject vehicle, and thereby can issue the alarm for preventing the rear-end collision.

The alarming device may include a device being responsive to the fact that the subsequently detected distance is shorter than the detected distance to compare the output signal value obtained from the operation member with the output signal value stored in the memory unit for issuing the alarm in accordance with a result of the comparison.

More preferably, the alarming device includes a first determining device for determining whether the subsequently detected distance is shorter than the detected distance, a second determining device being responsive to a result of the determination by the first determining device to determine whether a difference between the output signal value obtained from the operation member and the output signal value stored in the memory unit falls within a predetermined range or not, and a device for issuing the alarm based on a result of the determination by the second determining device.

When the difference between the stored output signal value and the output signal value obtained from the operation member falls outside the predetermined range, it is determined that the driver operated the speed control device for preventing the rear-end collision. Therefore, there is no possibility of a rear-end collision, and the alarm is not issued. When the difference falls within the predetermined range, this means that the driver does not perform a proper operation. Therefore, the alarm is issued.

The first determining device may include a reference distance setting device for setting a reference distance predetermined correspondingly to an arbitrary following distance, and a third determining device for determining, based on the subsequently detected following distance, whether the preceding vehicle has passed through a position at the reference distance corresponding to the initially detected distance.

When the distance to the preceding vehicle decreases below the initially detected distance, it is determined whether the alarm is to be issued or not. For example, when another vehicle in front moves into the same lane as the subject vehicle, alarming is not necessary if the vehicle in front is running at a higher speed than the subject vehicle. However, alarming must be issued if lower. The rear-end collision alarming device described above issues the alarm when the following distance decreases to the reference distance shorter than the initially detected distance. Therefore, the device can properly issue the alarm in response to the lane change, edging and others.

More preferably, the output signal value obtained from the operation member is stored in the memory unit in response to detection of the fact that the output of the following distance detector has kept the value of the initially detected distance for a predetermined time.

According to this structure, the subsequent detection of the following distance is performed after it is confirmed that the initially detected distance is a distance to the preceding vehicle running in substantially the same direction and at substantially the same speed as the subject vehicle. Therefore, it is possible to avoid erroneous alarming due to an oncoming vehicle and others.

Further preferably, the rear-end collision alarming device further includes a device for operating based on the output of the following distance detector to enable or disable an operation of the rear-end collision alarming device only within a range of the distance predetermined depending on the speed of the subject vehicle.

The possibility of the rear-end collision depends on the following distance and the running speeds of the vehicles. If the running speeds of the vehicles are high, the distance enabling the operation of the alarming device must be long. If the speeds are low, the distance enabling the operation may be short. In view of this, the rear-end collision alarming device according to the invention can perform operations adequate to various distances, depending on the speed.

According to another aspect of the invention, a display device used in a rear-end collision alarming device includes a first display for displaying in a bar graph form a following distance predetermined dependently on a speed of a subject vehicle and enabling an operation of the rear-end collision alarming device, and a second display for displaying and contrasting a distance to a preceding vehicle with the bar graph on the first display.

According to a further aspect of the invention, a rear-end collision alarming method includes the steps of: detecting a following distance to a preceding vehicle; storing in a memory unit an output signal value obtained from an operation member linked to a speed control device of a subject vehicle in response to the detection of the distance between the preceding and subject vehicles at the step of detecting the following distance; detecting subsequently the following distance; and issuing an alarm by determining a possibility of a rear-end collision based on the subsequently detected distance, the output signal value obtained from the operation member and the signal value stored in the storage unit.

Preferably, the step of issuing the alarm includes a first determining step of determining the fact that the subsequently detected distance decreases below the initially detected distance, a second determining step of determining whether a difference between the output signal value obtained from the operation member and the output signal value stored in the memory unit falls within a predetermined range or not in response to a result of the determination at the first determining step; and a step of issuing an alarm based on a result of the determination at the second determining step.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a flowchart showing an operation of a rear-end collision alarming device of a fifth embodiment.

DESCRIPTION OF THE PREFERRED EMBODIMENTS

Embodiments of the invention will be described later with reference to the drawings, but a concept of the invention will first be described with reference to the drawings.

Figure 1:
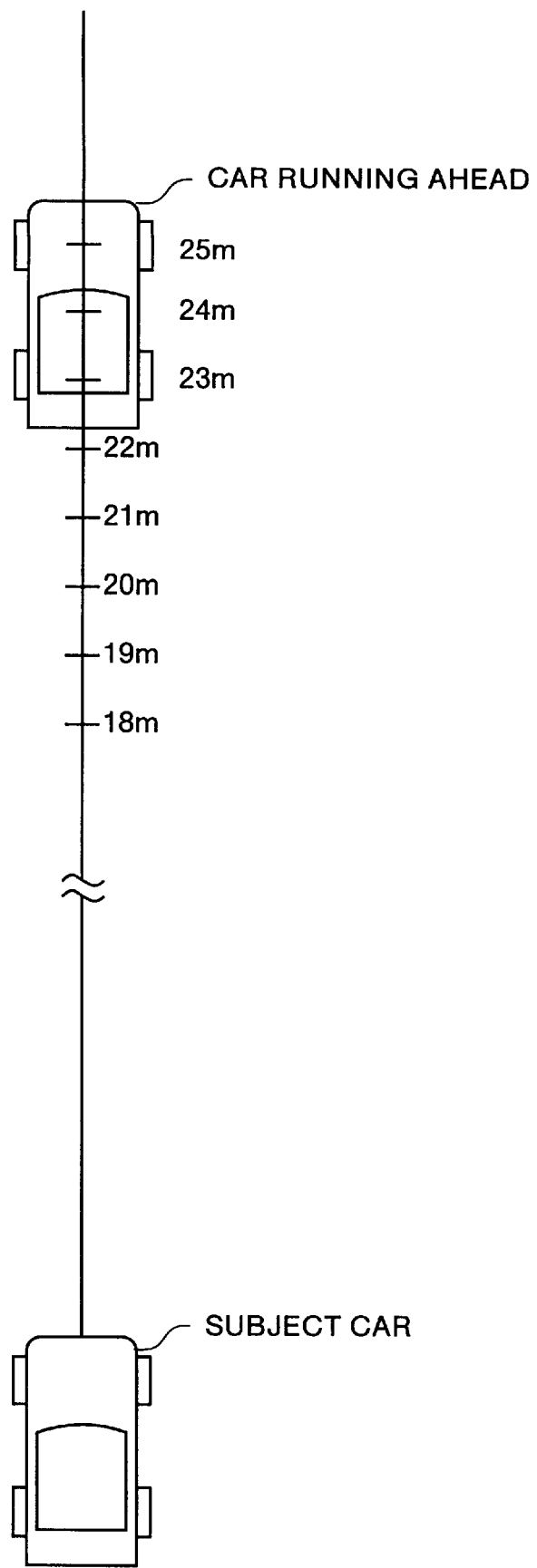
FIG. 1 illustrates an operation of the invention.

Referring to FIG. 1, it is now assumed that a subject vehicle or car is following a preceding vehicle, i.e., a car running ahead with a following distance of 22 m.

In FIG. 1, it is now assumed that a following distance detector mounted on the subject vehicle detected the distance of, e.g., 22 m to the preceding vehicle. In this situation, the distance to the preceding vehicle does not change if both the vehicles are running in the same direction at the same speed.

As already described, the safe running or driving is achieved when the vehicles are running without changing this distance of 22 m. When this distance decreases, a driver on the subject vehicle immediately releases a gas pedal or depresses a brake pedal to reduce the speed of the subject vehicle. Thus, the driver performs an operation coping with the change in distance to the preceding vehicle.

In view of the above, it can be said that the rear-end collision is caused by the fact that the driver does not perform a series of foregoing operations or performed with delay.

According to the invention, therefore, the following distance detector detects a distance between the vehicles when the distance decreases. In connection with the arbitrary distance thus detected, the following distance detector subsequently detects the following distance. The operations are performed as follows when the subsequently detected distance is equal to or lower than a predetermined distance determined depending on the initially detected distance and, in other words, when the second distance of a relatively small value is detected after the first distance of a relatively large value is detected. Thus, the rear-end collision alarming device determines whether a speed control device such as a gas pedal or a brake pedal of the subject vehicle is operated or not. When the speed control device is not operated, this means that the driver does not react to reduction in distance. Therefore, the alarming device issues a warning sound and/or light to notify the driver of approach to the vehicle running ahead.

First Embodiment

Figure 2:
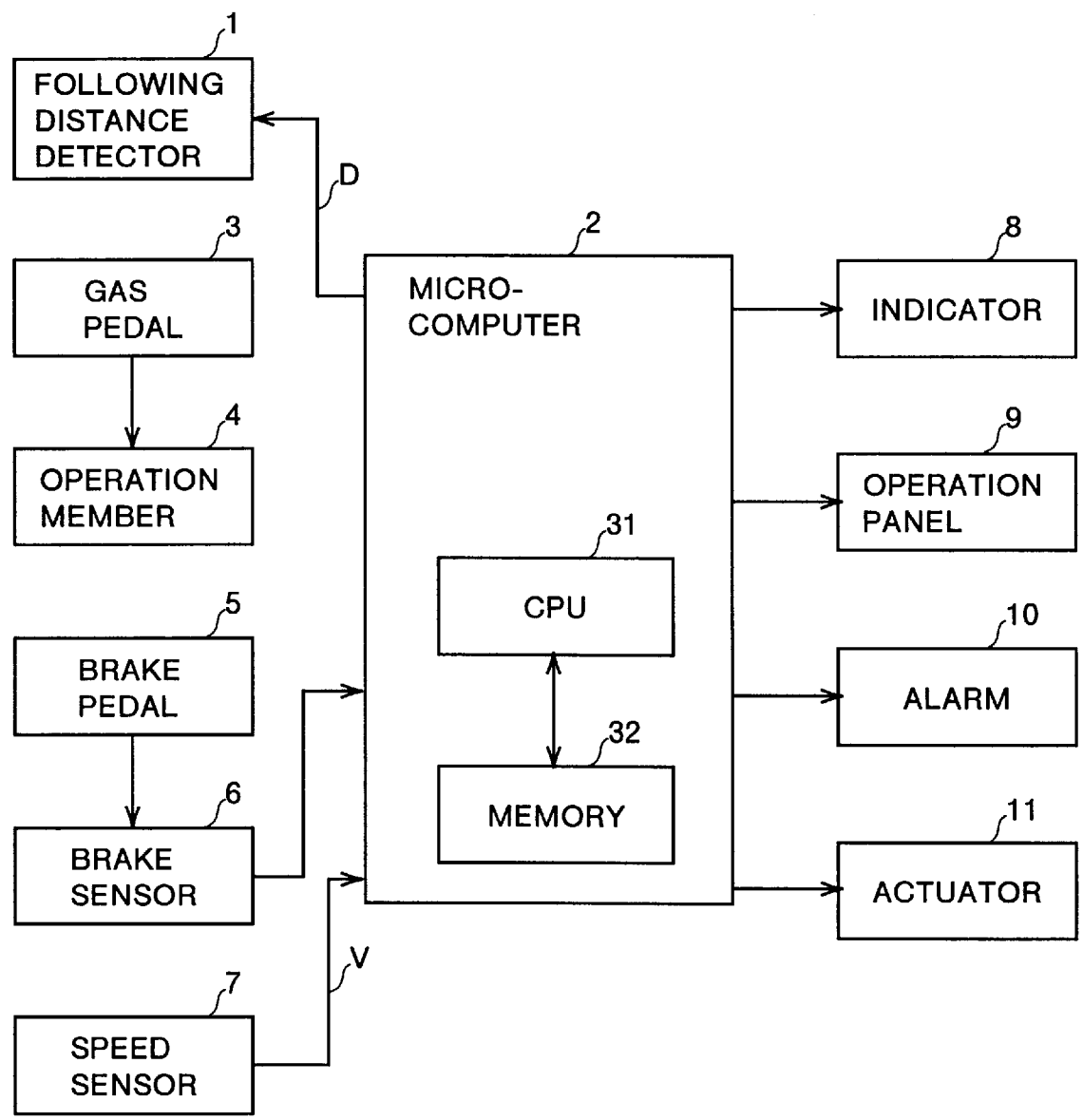
FIG. 2 is a block diagram showing an electrical structure of a rear-end collision alarming device of an embodiment of the invention.

Referring to FIG. 2, a rear-end collision alarming device of a first embodiment is mounted on a subject vehicle, and includes a following distance detector 1 for detecting or measuring a distance from the subject vehicle to a preceding vehicle, i.e., a vehicle running in front. Following distance detector 1 may be, for example, of a laser type using a laser beam or a millimeter wave for detecting the distance, or of a type performing image processing for detecting the following distance.

An output MD of following distance detector 1 is sent to a microcomputer 2, which is also supplied with an output from an operation member 4 moved in accordance with an operation of a gas pedal 3, an output from a brake sensor 6 and an output from a vehicle speed sensor 7. Gas pedal 3 and a brake are examples of the speed control devices in the subject vehicle. Microcomputer 2 has a known structure including a CPU 31 and a memory 32. Memory 32 is preferably of a nonvolatile type, but may be of a volatile type provided that it is battery-backed. Microcomputer 2 achieves the rear-end collision alarming device by executing a program having a control structure shown in flowcharts which will be described later.

Operation member 4 operates in proportion to a degree of depression of gas pedal 3 or a depressing pressure thereof, and thereby issues a signal. For example, operation member 4 includes a sensor or the like issuing a signal, of which value or magnitude changes in accordance with the operation of gas pedal 3, and more specifically includes, for example, a throttle sensor sensing a degree of opening of a throttle valve, an air flow meter arranged at an intake manifold for sensing an intake air flow, a vacuum sensor sensing a pressure in the intake manifold, an engine speed sensor sensing an engine speed or a touch sensor attached to gas pedal 3.

Brake sensor 6 senses the fact that a brake pedal 5 is depressed. Vehicle speed sensor 7 issues, as a speed signal V, a wheel speed pulse corresponding to a magnitude or degree of rotation of an encoder wheel arranged at a rotation axis of a wheel. Vehicle speed signal V may be obtained by utilizing an anti-lock braking system, if provided in the vehicle, or may be the same as a signal issued from a vehicle speed sensor for a speedometer. In a wide sense, vehicle speed sensor 7 can be a device linked to a device for speed control.

Microcomputer 2 performs processing, which will be described later, based on signals sent from the foregoing sensing units, sensors or the like, and operates to display a result of the processing on a display unit 8. When microcomputer 2 determines that there is a possibility of collision of the subject vehicle against the vehicle running ahead, it activates an alarm 10 to give an alarm to the driver of the subject vehicle. If necessary, microcomputer 2 can control an actuator 11 to apply forcedly a brake. A console panel 9 which can be operated by the driver is arranged at the vicinity of a driver seat. The driver can change initial settings and others for microcomputer 2, which will be described later, through console panel 9.

Figure 3:
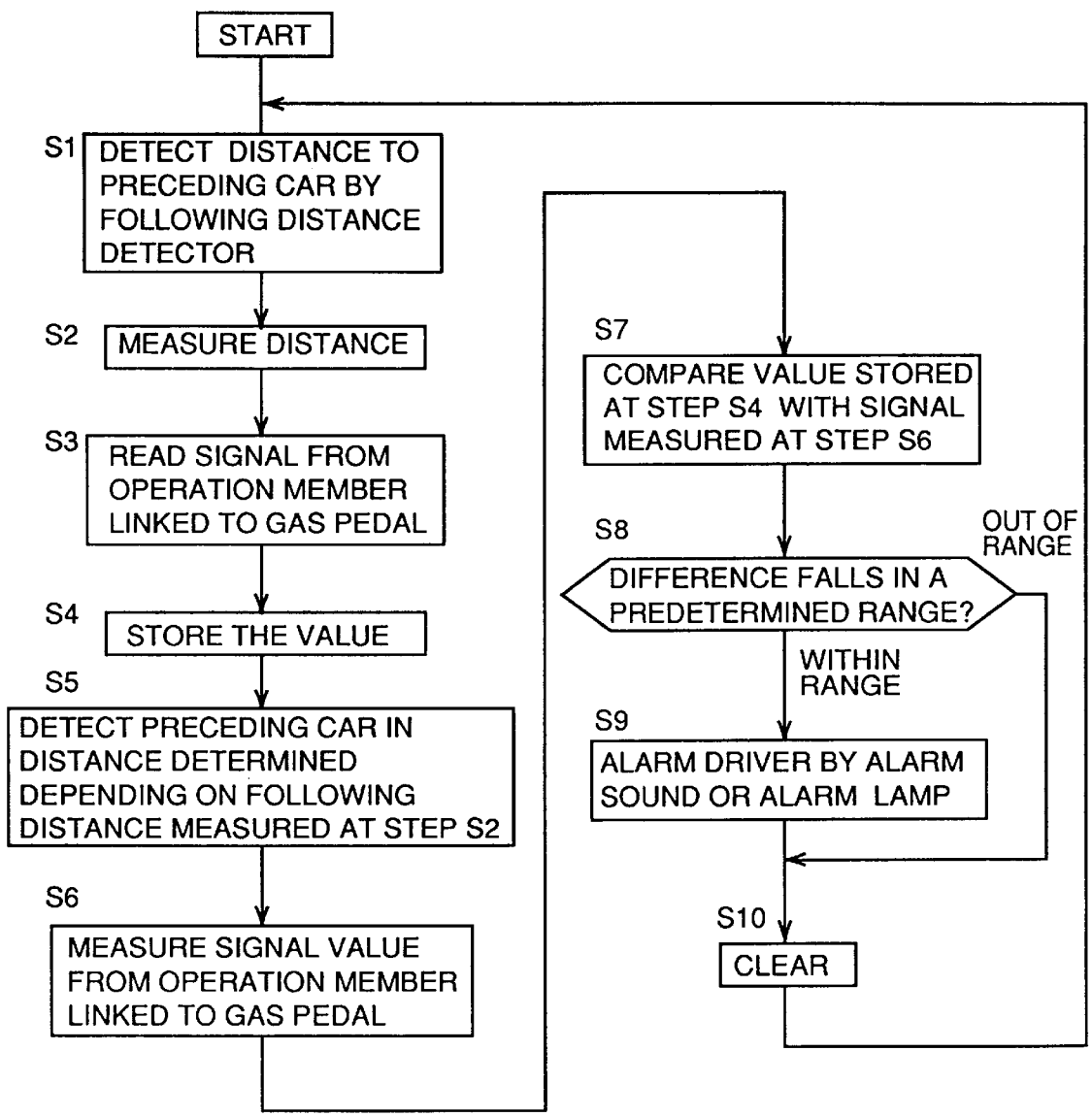
FIG. 3 is a flowchart showing an operation of the rear-end collision alarming device of a first embodiment.

Referring to FIG. 3, the rear-end collision alarming device according to the first embodiment operates as follows. In the following description, it is assumed that a relation shown in FIG. 1 is present between the subject vehicle and the preceding vehicle.

When the operation starts, following distance detector 1 mounted on the subject vehicle first detects the distance to the preceding vehicle (step SI). It is assumed that the initially measured distance D is equal to 22 m (step S2). This value is stored in a memory unit such as a register or a memory in microcomputer 2.

Then, microcomputer 2 reads in a signal sent from operation member 4 linked to gas pedal 3 (step S3), and stores the value of the read signal into the memory unit such as a register or a memory in microcomputer 2 (step S4). Thus, microcomputer 2 reads in and stores at least one of signals currently coming from operation member 4 which operates in accordance with the extent of depression or the depressing force of gas pedal 3, and more specifically at least one of signals currently sent, e.g., from the gas pedal angle sensor, air flow meter in the intake manifold, throttle valve sensor, engine speed sensor, vehicle speed sensor 7 or a touch sensor attached to gas pedal 3.

Then, vehicle distance detector 1 successively repeats the operation of detecting the distance between the subject vehicle and the preceding vehicle, and outputting a result of the detection. Microcomputer 2 is monitoring the following distance thus detected. When the distance between the subject vehicle and the preceding vehicle decreases to or below a reference distance which is predetermined with respect to the following distance measured at step S2 (step S5), microcomputer 2 reads in the output signal value sent from operation member 4 (step S6). The reference distance, which is predetermined with respect to the following distance D of 22 m measured at step S2, is shorter than the distance measured at step S2, and is equal to, e.g., 20 m. The reference distances are preset with respect to various values of the following distance to be measured first, respectively, and are stored in the memory of microcomputer 2.

Determination of whether the following distance decreases to or below the preset or predetermined reference distance or not can be performed based on the output of following distance detector 1.

When it is determined that the following distance decreases to or below the reference distance, microcomputer 2 then compares the output signal value sent from operation member 4 and stored at step S4 with the output signal value sent from operation member 4 and measured at step S6 (step S7). Microcomputer 2 evaluates the result of this comparison at step S8, and determines whether alarm 10 is to be operated or not.

Thus, the comparison is made between the output signal value, which is stored in the memory and was sent from operation member 4 when the initially measured following distance was equal to 22 m, and the output signal value which has been sent from operation member 4 when the following distance decreases to or below 20 m. When a difference between them falls within a range defined between predetermined upper and lower limits, an alarm is issued. This alarm is issued because it was determined, in the above case, that the driver in the subject vehicle does not perform a proper operation such as releasing of gas pedal 3 in spite of change in distance between the subject and preceding vehicles. Microcomputer 2 gives an alarm to the driver by issuing alarm sounds or light from alarm 10.

When the driver notices reduction in following distance, and performs a proper operation with respect to this by releasing gas pedal 3 or depressing brake pedal 5, the alarm is not issued. This is because the output signal value, which is sent from operation member 4 when the following distance decreases to or below 20 m, is lower than the output signal value stored in the memory, and falls outside the predetermined range.

In some cases, the driver accelerates the vehicle for passing the vehicle in front while making a lane change. In this case, it is not necessary to issue the alarm even when the following distance decreases. This is because the driver has recognized the fact that the distance between the subject and preceding vehicle has temporarily decreased. In this situation, the output signal value, which is sent from operation member 4 when the following distance is 20 m or less, exceeds the output signal value stored in the memory, and falls outside the predetermined range. Therefore, the processing according to the flowchart in FIG. 3 does not issue an alarm.

According to the first embodiment, as described above, the possibility of rear-end collision is determined based on the reaction of the driver at the time when the distance between the subject and preceding vehicles decreases. The alarming device detects the difference between the output signal values which correspond to at least two following distance values, respectively, and are sent from operation member 4 linked to gas pedal 3, and determines the possibility of the rear-end collision based on whether or not the difference falls within the range, which is defined between the predetermined upper and lower limits and can be deemed to represent the fact that operation member 4 is not substantially operated or changed. In this manner, it is possible to issue the alarm more reliably than the case where the possibility of rear-end collision is determined based on only the relative speed between the subject and preceding vehicles.

Second Embodiment

In the first embodiment, the output signal value sent from operation member 4 linked to gas pedal 3 is immediately read (step S3) when the distance to the preceding vehicle detected by following distance detector 1 is measured. In this structure, the rear-end collision alarming device may malfunction to issue the alarm in response to, e.g., detection of a distance to an oncoming vehicle, even when both the subject vehicle and the oncoming vehicle are running normally and there is no risk of collision.

The second embodiment can prevent the foregoing malfunction. In the second embodiment, the relation between the subject and preceding vehicles is the same as that of the first embodiment shown in FIG. 1, and the electrical structure is the same as that shown in the block diagram of FIG. 2.

Figure 4:
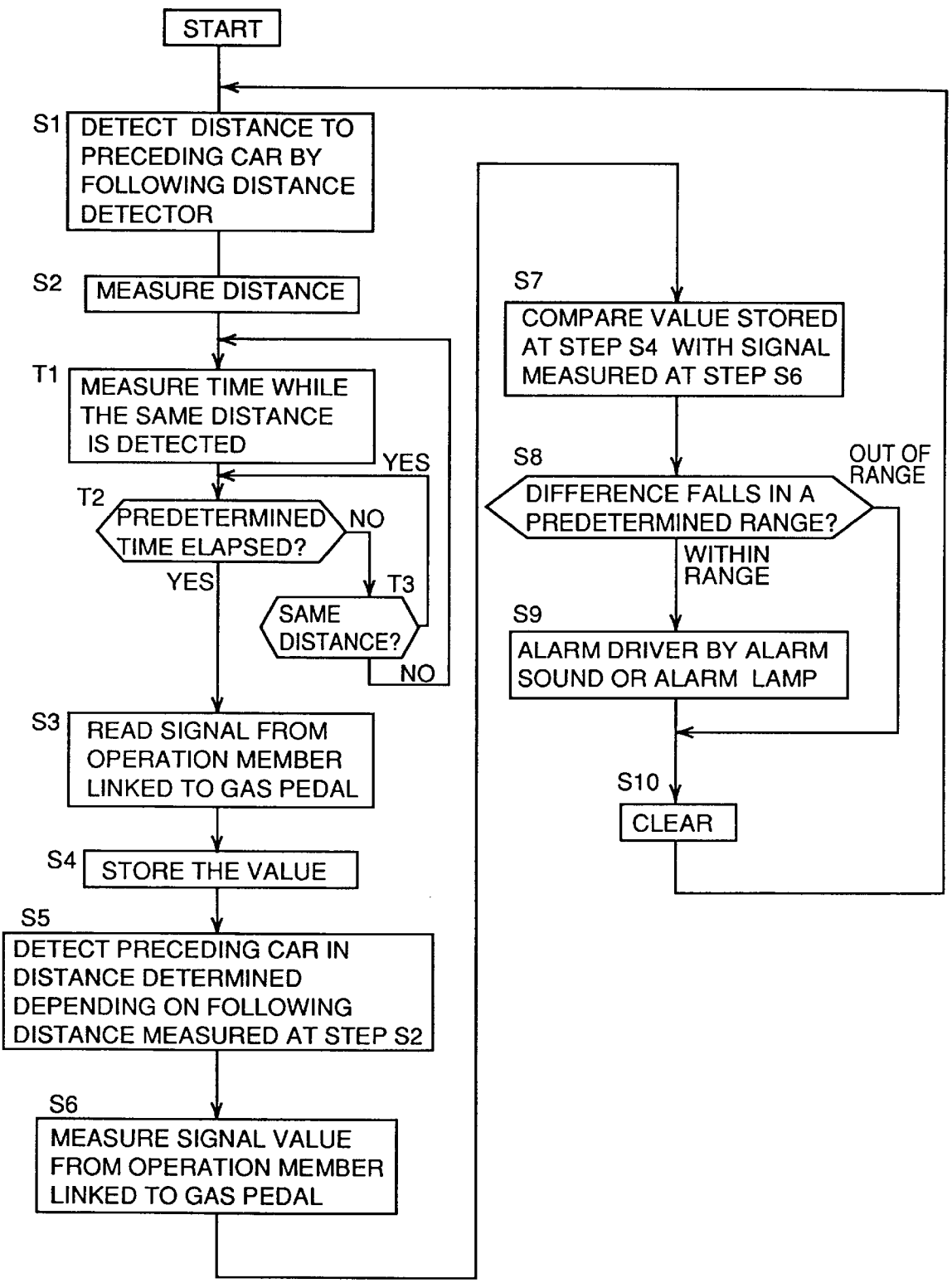
FIG. 4 is a flowchart showing an operation of the rear-end collision alarming device of a second embodiment.

Referring to FIG. 4, when the rear-end collision alarming device according to the second embodiment starts the operation, following distance detector 1 mounted on the subject vehicle detects the distance to the preceding vehicle or car (step S1). It is assumed that the measured distance D is equal to, e.g., 22 m (step S2). Microcomputer 2 determines whether the measured distance D continuously maintains the substantially constant value without a change for a predetermined time (e.g., 2 seconds) or not (steps T1 and T2).

When the following distance D changes from 22 m before elapsing of the predetermined time, processing of measuring the time starts with respect to the subsequently detected distance (steps T3-T1-T2). More specifically, when the following distance D changes from 22 m, a value of the measured time for which a constant following distance was maintained is cleared, and a timer starts measurement of the time with respect to the subsequently measured value of following distance D.

This timer is formed of, e.g., a software timer in microcomputer 2. The predetermined time of, e.g., 2 seconds can be arbitrarily changed by an operation through console panel 9 so that the rear-end collision alarming device can be adjusted in accordance with driving characteristics of the driver.

As described above, the operation of determining whether the following distance D detected by following distance detector 1 is substantially unchanged or not is continued for the predetermined time. The reason for this is to confirm that the object in front detected by following distance detector 1 is a vehicle preceding the subject vehicle and running substantially in the same direction and at the same speed as the subject vehicle. If the constant distance is not continuously kept for a certain time, the possibility that the vehicle running in front is an oncoming vehicle is high. According to the above processing, therefore, it is possible to determine properly the vehicle running in front.

The following processing is performed for the preceding vehicle which is running substantially in the same direction and at the same speed as the subject vehicle.

Upon elapsing of the predetermined time (2 seconds) at step T2, microcomputer 2 reads in the output signal value sent from operation member 4 linked to gas pedal 3 (step S3), and stores the value in the memory (step S4). Subsequent operations from step S5 to step S10 are completely the same as those from step S5 to step S10 in the flowchart of FIG. 3, and therefore will not be repeated here.

In the second embodiment described above, the time measuring function of, e.g., the software timer is used to measure the time for which the detected following distance keeps substantially the constant value. Based on whether the predetermined time has elapsed or not, it is determined whether the object in front is a preceding vehicle or not, and the rear-end collision alarming device operates for alarming only when it is the preceding vehicle. Therefore, it is possible to suppress an erroneous operation in response to the oncoming vehicle.

In the processing at step T3, such a situation hardly occurs that the measured distance does not change at all. Therefore, if it were determined at step T2 whether the distance is completely constant, the alarming device would be impractical. In view of this, a reference for comparison of distances in step T3 is defined between upper and lower limits which are larger and lower by certain margins than the following distance measured at step S2, respectively. If the measured value falls within a range between the upper and lower limits, this value is deemed to be equal to the value detected at step S2. Thereby, the rear-end collision alarming device can be practical.

According to the flowchart in FIG. 4, the output signal value sent from operation member 4 is read immediately after elapsing of the predetermined time. However, the timing for reading the output signal value is not restricted to this. For example, such a manner may be employed that output signal values are measured at short periods after elapsing of a predetermined time, and the last one of the measured output signal values falling within the foregoing range is read and stored. Alternatively, the output signal value sent from operation member 4 may be read when the device detects the distance which is shorter than the distance measured at step S2 by a value exceeding the above margin.

These are preferable for the following reason. Usually, for keeping substantially a constant distance to the preceding vehicle, the driver continuously operates gas pedal 3 to control the following distance by increasing or decreasing the speed, if necessary. In this case, the speed control device is operated for keeping the constant following distance. Therefore, the output signal value sent from operation member 4 may continuously change even after steps S3 and S4 after elapsing of the time predetermined at step T2. The difference between these changing values may fall outside a predetermined range which is used for determination at step S8. If the driver in the subject vehicle, of which alarming device is in the above state, does not notice the approach to the preceding vehicle, a serious error occurs that an alarm, which is to be issued from alarm 10, is not issued because the difference between the output signal values sent from operation member 4 has already fallen outside the predetermined range.

For the foregoing reasons, a reliability of determination at step S8 can be increased by such an operation that the output signal value of operation member 4, which is to be compared at step S7, is obtained when the operation of gas pedal 3 is stabilized or at the time close to the time of reading the second output signal value sent from operation member 4 for comparison.

Third Embodiment

Figure 5:
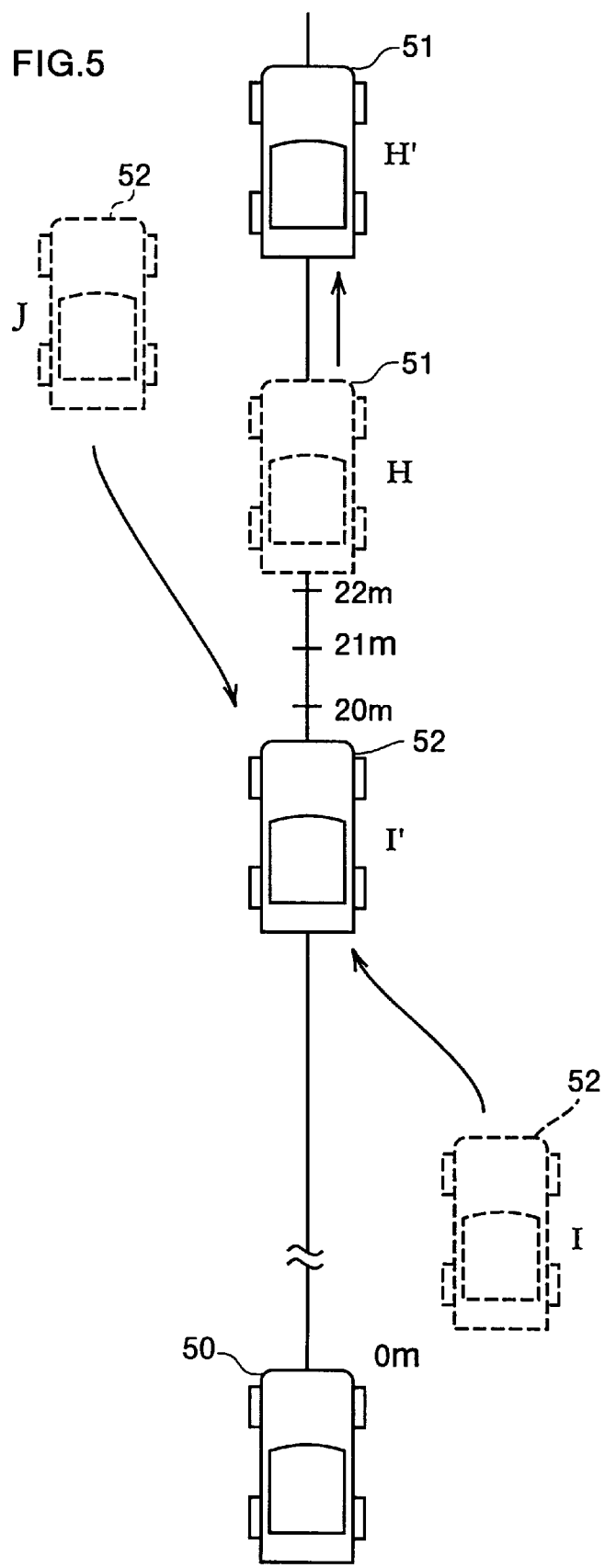
FIG. 5 illustrates processing performed when another vehicle moves into a position between a subject vehicle and a preceding vehicle.

Referring to FIG. 5, a rear-end collision alarming device according to a third embodiment of the invention will be described below in detail. It is now assumed that a vehicle 51 represented by broken line and running ahead is located at a position H with respect to a subject vehicle 50 which follows vehicle 51 with a distance of 22 m therebetween. It is also assumed that preceding vehicle 51 then moves from position H to a position H' while increasing a speed, and another vehicle 52, which was located at a position I in another lane, makes a lane change while increasing a speed, and moves to a position I' in the same lane as subject vehicle 50. Further, it is assumed that the distance between new preceding vehicle 52 and subject car 50 is shorter than the predetermined distance of 20 m.

In this case, another vehicle 52 moves at a higher speed than subject vehicle 50 into a position in front of subject vehicle 50. Therefore, the driver in subject vehicle 50 is not necessarily required to perform an operation such as releasing of gas pedal 3. Therefore, the operation of the rear-end collision alarming device for issuing an alarm is not required.

Then, it is assumed that another vehicle 52 which was at a position J moves to position I' in the same lane as subject vehicle 50 while decreasing a speed.

In this case, another vehicle 52 runs at a lower speed than subject vehicle 50 so that there is a possibility that subject vehicle 50 collides against vehicle 52 in front. The driver must perform a proper operation such as releasing of gas pedal 3. In this case, therefore, the rear-end collision alarming device must operate to issue an alarm.

When another vehicle moves to a forward position in the same lane as the subject vehicle from another lane, the possibility of rear-end collision depends on whether the preceding vehicle is faster than subject vehicle or not and, in other words, whether the vehicle moving into the same lane will move away from subject vehicle or not.

In the example shown in FIG. 3 or 4, the speed of such a preceding vehicle cannot be determined. In the third embodiment, therefore, a first distance range is determined, in which following distances are predetermined with respect to arbitrary measured following distances, and a second distance is determined with respect to each of the distances in the first distance range. Based on these range and distances, correct processing is performed with respect to the preceding vehicle coming into the same lane as described above.

For example, when the first measured following distance is 22 m, a range not exceeding 20 m is determined as the predetermined first distance range, and a distance of 19 m is determined as the second distance with respect to 20 m. If the preceding vehicle moves from another lane to a position at a distance of 17 m, which falls within the first distance range of 20 m or less, in the same lane, the distance of 16 m is determined as the second distance with respect to 17 m.

Figure 6:
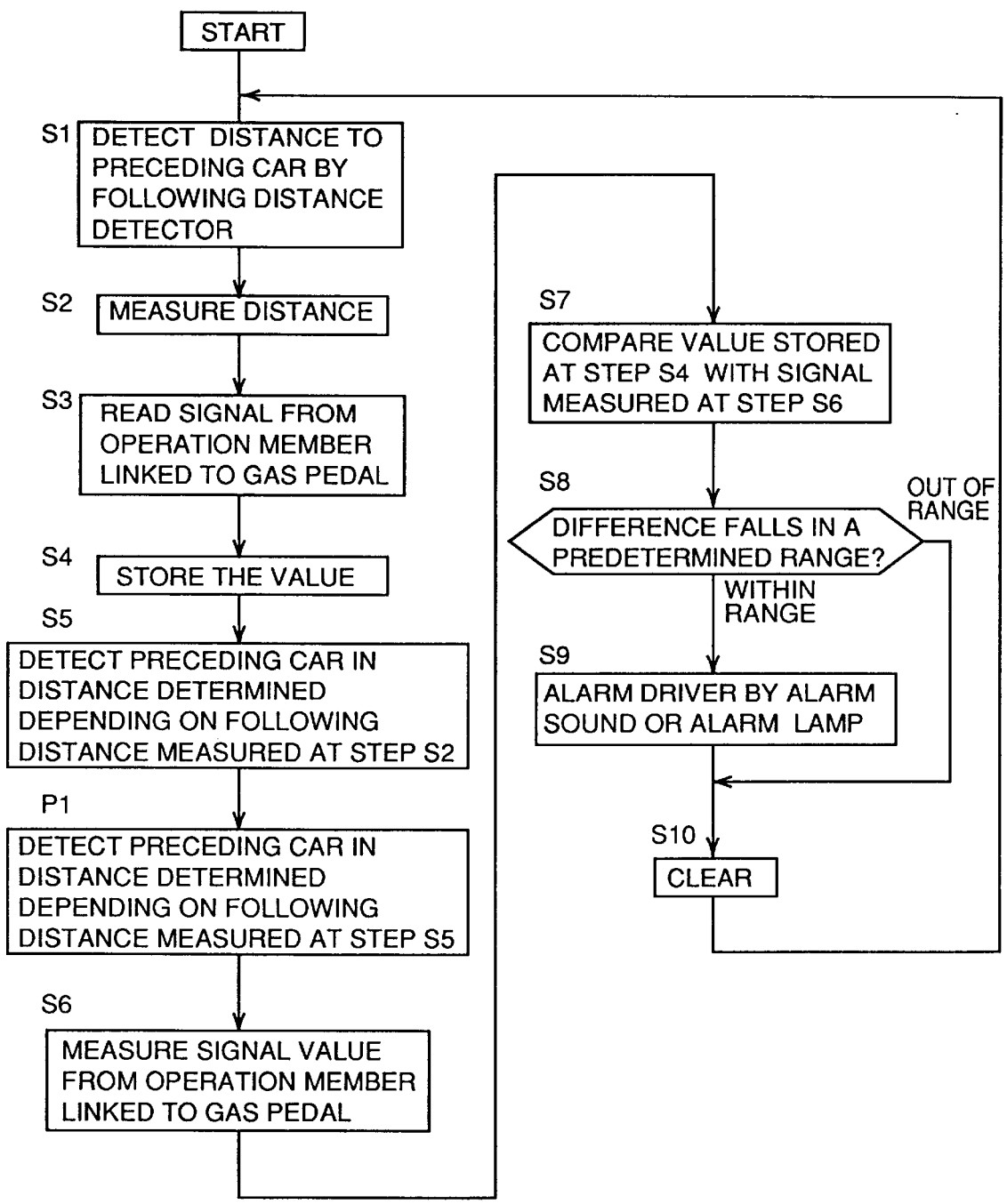
FIG. 6 is a flowchart showing an operation of a rear-end collision alarming device of a third embodiment.

FIG. 6 is a flowchart which contains the contents of the flowchart of the first embodiment shown in FIG. 3 and additionally contains contents of the foregoing processing in the third embodiment. In FIG. 6, it is determined at step S5 that the distance to the preceding vehicle moved into the same lane becomes equal to the distance, which is predetermined with respect to the following distance of a certain value measured first at step S2, and then it is determined whether the preceding vehicle approaches the subject vehicle or not (step P1). Thereby, it is determined whether the preceding vehicle moved into the same lane at a higher speed than the subject vehicle or not.

If the preceding vehicle moves into the same lane at a higher speed than the subject vehicle, it will pass through a position only in the first distance range (step S5). However, if the preceding vehicle moves into the same lane at a lower speed, the preceding vehicle will pass through the above position as well as a position at the second distance (step P1).

In this embodiment, the second output signal value sent from operation member 3, which is to be compared with the output signal value stored in the memory of microcomputer 2, is measured after passage through the position at the second distance (step S6). Alternatively, the second output signal may be measured when the first following distance is detected. Two or more distances may be set as the second distance, which improves the accuracy.

Fourth Embodiment

An rear-end collision alarming device according to a fourth embodiment is enabled only when the following distance is within a predetermined range, which varies depending on the speed of the subject vehicle.

For example, when the subject vehicle runs at a speed of 50 km/h, the rear-end collision alarming device can operate in response to the following distance not exceeding 25 m. At the speed of 100 km/h, the device can operate in response to the following distance not exceeding 50 m. In this manner, the operation of the rear-end collision alarming device is restricted depending on the following distance and the speed of the subject vehicle. However, the distance detected by the following distance detector is displayed independently of this restriction.

The above structure is necessary for the following reason. It is now assumed that both the preceding and subject vehicles are running at the same speed of 40 km/h in the same direction. In this case, when the subject vehicle is spaced by a long distance of 100 m from the preceding vehicle, slight approach to the preceding vehicle does not immediately increase the risk of collision, and therefore it is not necessary to operate the rear-end collision alarming device to issue an alarm.

However, when the following distance is short and is equal to, e.g., 15 m or 20 m, even the slight approach increases a risk of collision even if the running speed is low. Therefore, the alarm must be immediately issued.

As described above, the relation between the speed of the subject vehicle and the following distance is important in the rear-end collision alarming device. The rear-end collision alarming device can be more practically useful if it is enabled even if the following distance is long when the running speed is high, and is enabled only if the following distance is short when the running speed is low.

Figure 7:
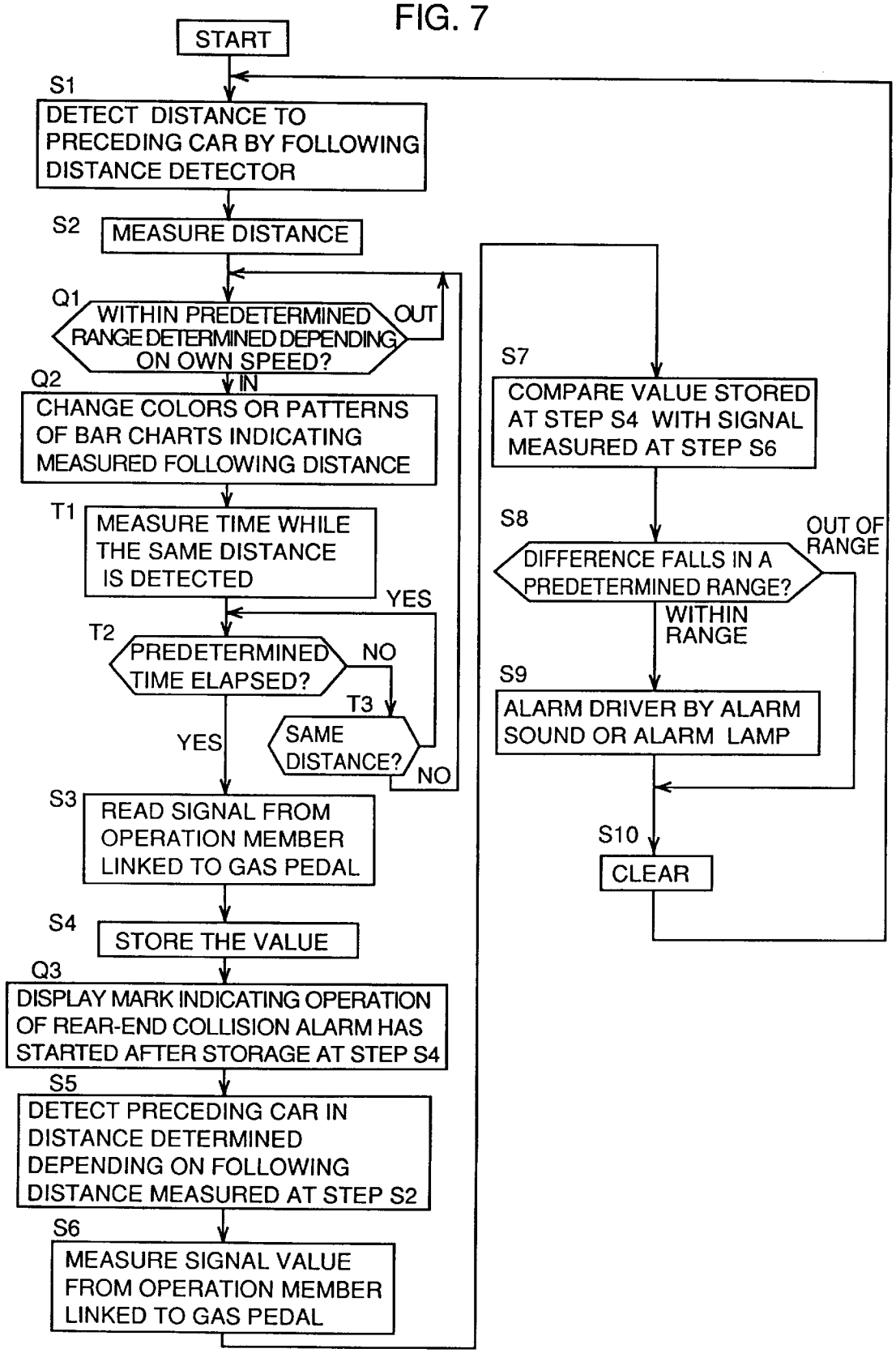
FIG. 7 is a flowchart showing an operation of a rear-end collision alarming device of a fourth embodiment.

FIG. 7 is a flowchart showing an example in which the foregoing function in the fourth embodiment are added to the flowchart of the second embodiment shown in FIG. 4. Referring to FIG. 7, the distance to the preceding vehicle is measured at step S2, and thereafter it is determined at step Q1 whether the measured distance falls within the distance range determined depending on the speed of the subject vehicle or not. If the distance falls outside the predetermined range, the control returns to step Q1. If the distance falls within the predetermined range, the control advances to step Q2.

Figure 8:
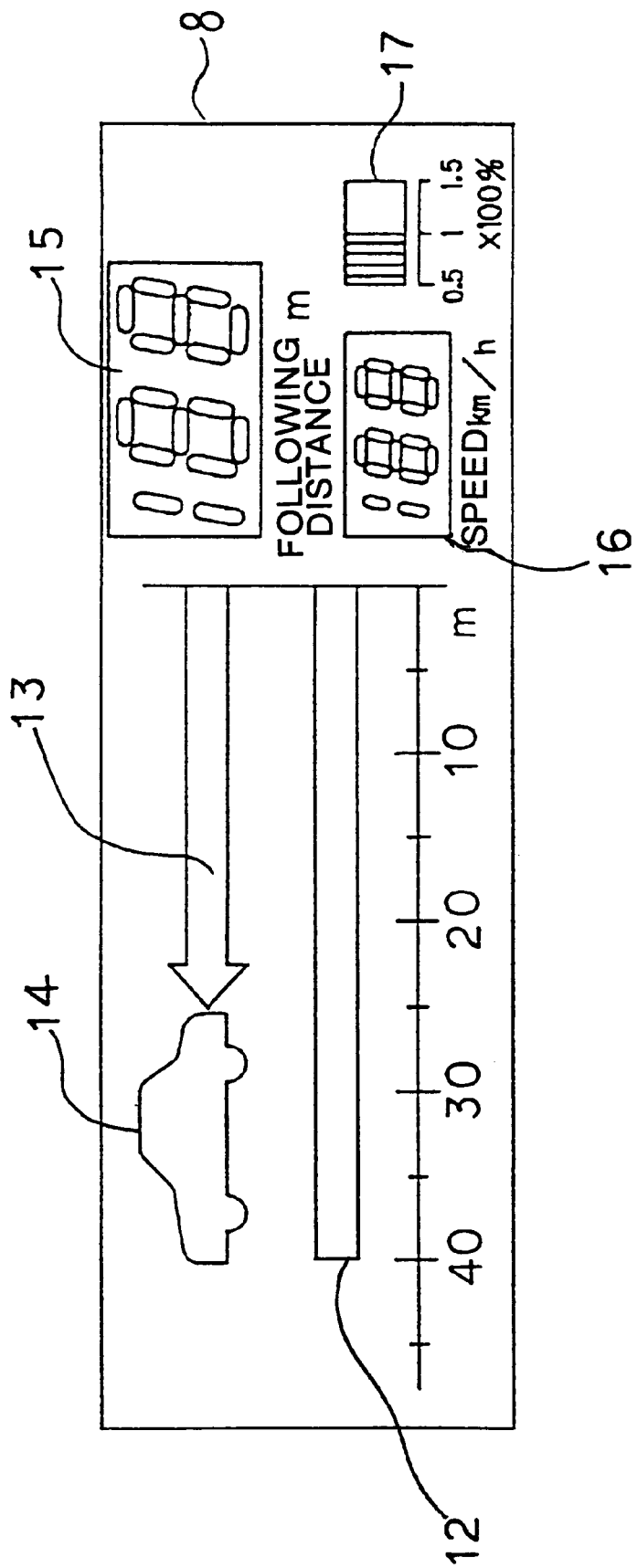
FIG. 8 shows a picture displayed on a display unit of the rear-end collision alarming device of the fourth embodiment.

At step Q2, a warning is given to the driver in the following manner. FIG. 8 shows display unit 8 of a liquid crystal display inside the vehicle. Display unit 8 displays a bar graph 12 indicating the following distance which enables the rear-end collision alarming device and depends on the current speed of the vehicle, and also displays, for comparison with graph 12, a bar graph 13 indicating the distance to the preceding vehicle which is currently detected by following distance detector 1. When the distance to the preceding vehicle lowers to or below the predetermined following distance which depends on the speed of the subject vehicle and enables the rear-end collision alarming device (step Q3), display unit 8 changes colors or patterns of bar graph 13 indicating the distance to the preceding vehicle for highlighting the same. Thereby, display unit 8 allows easy recognition of the operation state of the rear-end collision alarming device by the driver.

As already described in connection with the second embodiment, it is determined whether the object in front is a vehicle running ahead, and for this purpose, the time is predetermined. When this predetermined time for confirming the preceding vehicle (step T2) elapses or when the output signal value sent from operation member 4 linked to operation of gas pedal 3 is stored in the memory (step S4), a mark 14 graphically representing a car is displayed at a leading edge of bar graph 13 indicating the following distance (step Q3). In FIG. 8, digital displays 15 and 16 display the measured distance to the preceding vehicle and the speed of the subject vehicle, respectively.

Figure 9:
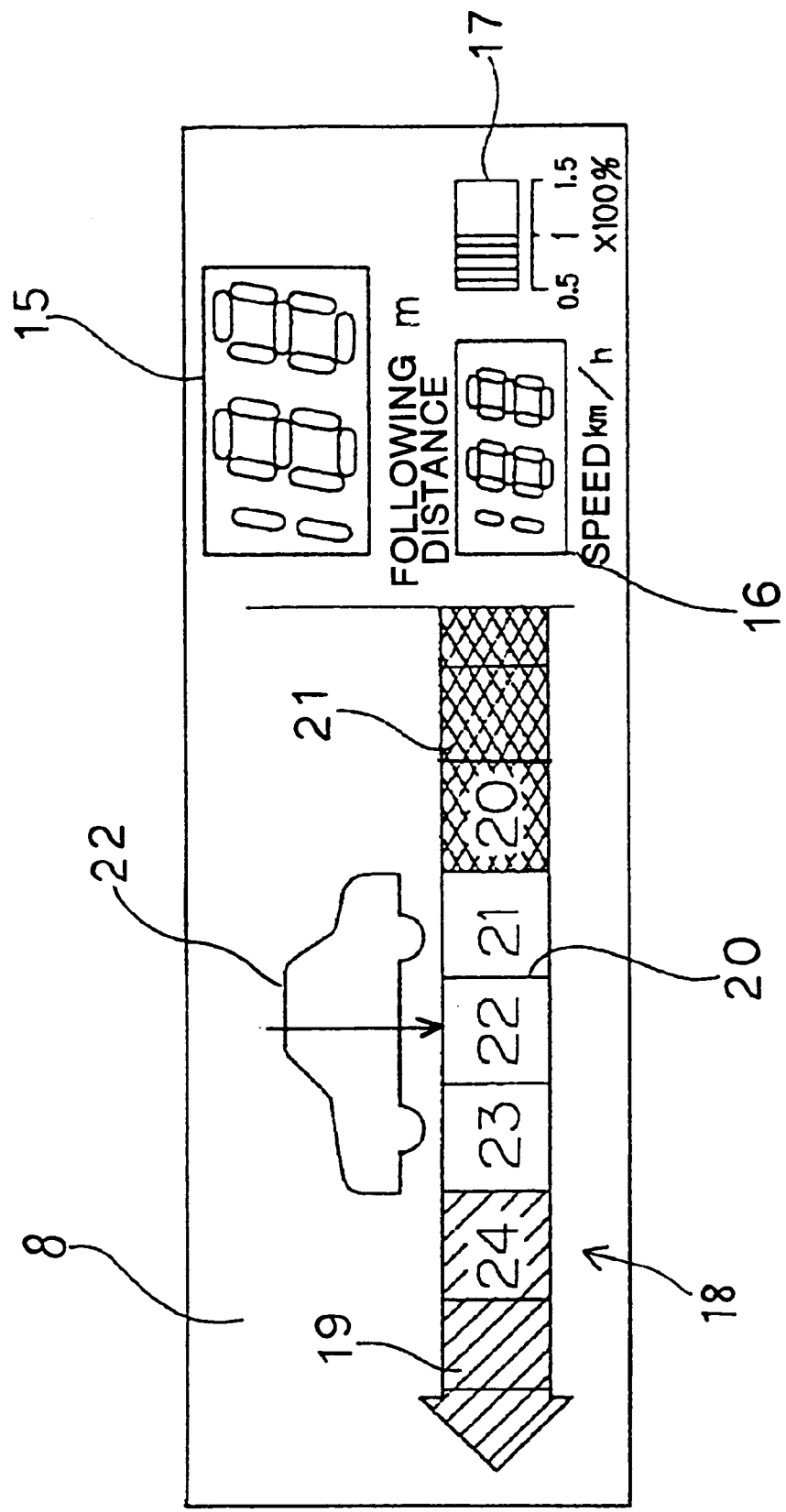
FIG. 9 shows another picture displayed on the display unit of the rear-end collision alarming device of the fourth embodiment.

FIG. 9 is another example of a displayed picture on display unit 8. This picture contains a bar graph 18, which indicates the distance to the preceding vehicle. Bar graph 18 includes a portion 19 indicating a relatively long distance, a portion 20 indicating the distance range which activates the time measurement already described in detail in connection with the second embodiment, and a portion 21 indicating a range of the following distance which is predetermined corresponding to the following distance detected by following distance detector 1.

These portions may be displayed in different colors such as blue, yellow and red, respectively, if display unit 8 is formed of a color liquid crystal. Alternatively, these portions may be displayed in different patterns such as hatching, outline and solid, respectively.

For comparison with bar graph 18, an index 22 is displayed above bar graph 18 together with a graphical mark of a car. Index 22 is laterally movable along bar graph 18, and indicates the currently measured following distance. A portion of bar graph 18 such as portion 22, which represents the distance and is indicated by index 22, may be highlighted in a different color or pattern for easy recognition by the driver.

Owing to the display function shown in FIG. 9, the driver can recognize the relation between the subject vehicle and the preceding vehicle at first glance, and can easily know an extent or degree of operation of gas pedal 3 by which the driver can keep the following distance 20 keeping the time measuring operation active, or a distance which the subject vehicle can relatively move toward the preceding vehicle before activation of alarm 10.

In the fourth embodiment shown in FIGS. 7 and 8, mark 14 graphically representing the car is turned on and displayed (step Q3) when the output signal value sent from operation member 4 is stored (step S4). The invention is not restricted to this. After this display, the displayed picture in FIG. 8 may be automatically changed into the displayed picture in FIG. 9. When the operation at step S4 is completed, the displayed picture in FIG. 8 may be immediately changed into the displayed picture in FIG. 9 without turning on and displaying mark 14 (step Q3). The displayed picture may be changed by an operation by the driver through console panel 9.

As described above, display unit 8 of the liquid crystal display displays the distance enabling the rear-end collision alarming device and the measured following distance by bar graphs 12 and 13 in a contrasted manner, respectively. When the measured distance to the preceding vehicle decreases to or below the distance enabling the rear-end collision alarming device, bar graph 13 is highlighted in a color or a pattern. Upon elapse of the predetermined time or storage of the output signal, mark 14 is turned on and displayed to indicate the start of the operation of the rear-end collision alarming device for alarming. Display unit 8 also displays region 20 of the following distance which activates the time measuring operation for the alarming operation of the rear-end collision alarming device, and further displays region 21 of the predetermined following distance. From these various displayed contents, the driver can know at a first glance the state of operation of the rear-end collision alarming device with respect to the preceding vehicle, and therefore can advantageously obtain an index for safe driving.

Through a controller arranged on console panel 9, the driver can freely change the distance which is variable depending on the speed of the subject vehicle and enables the operation of the rear-end collision alarming device. For example, the distance which was set to 25 m when the speed was 50 km/h can be increased to 30 m or can be reduced to 20 m. Display unit 8 displays a setting rate as a percentage (FIGS. 8 and 9, element 17). Bar graph 12 also changes in length in accordance with the set rate.

Owing to this setting function, the operation of the rear-end collision alarming device can be specifically adjusted in accordance with change in driving characteristics of respective drivers, physical conditions of the drivers and/or driving environments such as rain, snow or night.

Fifth Embodiment

The rear-end collision alarming device can be more effective and reliable if processing in the flowcharts shown in FIGS. 3, 4, 6 and 7 are combined. A fifth embodiment employs this combination as shown in a flowchart in FIG. 10. In FIG. 10, the same steps as those in FIGS. 3, 4, 6 and 7 bear the same reference characters. Each of the steps in FIG. 10 is already described, and therefore will not be repeated here.

The fifth embodiment can achieve all the advantages of the first to fourth embodiments.

According to the invention, as described above, it is determined whether a series of operations to be performed by the driver is performed or not when the subject vehicle approaches the preceding vehicle. When it is determined that the appropriate operation is not performed, alarm 10 gives an alarm to the driver, or forcedly activates actuator 11 of the brake or the like. Consequently, the device can prevent a careless rear-end collision, and can contribute to traffic safety.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. The rear-end collision alarming device comprising:

a following distance detector;

a memory unit for storing an output signal value obtained from an operation member linked to a speed control device in a subject vehicle in response to detection of the distance between the subject vehicle and a preceding vehicle by said following distance detector; and alarming means for responding to subsequent detection of the following distance by said following distance detector by determining a possibility of a rear-end collision for issuing an alarm based on said subsequently detected following distance the output signal value obtained from said operation member and the signal value stored in said memory unit, wherein said alarming means includes:

first determining means for determining the fact that said subsequently detected distance is shorter than said detected distance;

second determining means for responding to a result of the determination by said first determining means by determining whether a difference between the output signal value obtained from said operation member and the output signal value stored in said memory unit falls within a predetermined range or not; and means for issuing said second determining means, and wherein said first determining means includes:

reference distance setting means for setting a reference distance predetermined correspondingly to an arbitrary value of the following distance; and third determining means for determining, based on said subsequently detected following distance, whether the preceding vehicle passed through a position at the reference distance corresponding to said detected distance.

2. The rear-end collision alarming device comprising:

a following distance detector;

a memory unit for storing an output signal value obtained from an operation member linked to a speed control device in a subject vehicle in response to detection of the distance between the subject vehicle and a preceding vehicle by said following distance detector; and alarming means for responding to subsequent detection of the following distance by said following distance detector by determining a possibility of a rear-end collision for issuing an alarm based on said subsequently detected following distance the output signal value obtained from said operation member and the signal value stored in said memory unit, wherein said alarming means includes:

first determining means for determining the fact that said subsequently detected distance is shorter than said detected distance;

second determining means for responding to a result of the determination by said first determining means by determining whether a difference between the output signal value obtained from said operation member and the output signal value stored in said memory unit falls within a predetermined range or not; and means for issuing said second determining means, wherein said first determining means includes:

reference distance setting means for setting a reference distance predetermined correspondingly to an arbitrary value of the following distance; and third determining means for determining, based on said subsequently detected following distance, whether the preceding vehicle passed through a position at the reference distance corresponding to said detected distance, and wherein said first determining means further includes fourth determining means for determining whether the distance between said preceding and subject vehicles is shorter than said reference distance or not in response to the determination by said third determining means of the fact that the preceding vehicle passed through the position at the reference distance corresponding to said detected distance.

3. The rear-end collision alarming device according to claim 2, wherein said fourth determining means includes:

means for setting at least one distance detection point related to said detected distance for detecting the distance shorter than the corresponding reference distance, in addition to the point at the reference distance; and means for determining whether the distance detected by said following distance detector covers said distance detection point related to said detected distance.

4. A rear-end collision alarming method comprising the steps of:

detecting a following distance to a preceding vehicles;

storing in a memory unit an output signal value obtained from an operation member linked to a speed control device of a subject vehicle in response to the detection of the distance between the preceding and subject vehicles at said step of detecting said following distance;

detecting subsequently the following distance; and issuing an alarm by determining a possibility of a rear-end collision based on said subsequently detected distance, said output signal value obtained from said operation member and said signal value stored in said storage unit, wherein said step of issuing the alarm includes:

a first determining step of determining the fact that said subsequently detected distance decreased below said detected distance;

a second determining step of determining whether a difference between said output signal value obtained from said operation member and said output signal value stored in said memory unit falls within a predetermined range or not in response to a result of the determination at said first determining step; and a step of issuing an alarm based on a result of the determination at said second determining step, and wherein said first determining step includes:

a step of setting a reference distance predetermined correspondingly to an arbitrary value of the following distance; and a third determining step of determining, based on said subsequently detected following distance, whether the preceding vehicle passed through a position at the reference distance corresponding to said detected distance.

5. A rear-end collision alarming method comprising the steps of:

detecting a following distance to a preceding vehicles;

storing in a memory unit an output signal value obtained from an operation member linked to a speed control device of a subject vehicle in response to the detection of the distance between the preceding and subject vehicles at said step of detecting said following distance;

detecting subsequently the following distance; and issuing an alarm by determining a possibility of a rear-end collision based on said subsequently detected distance, said output signal value obtained from said operation member and said signal value stored in said storage unit, wherein said step of issuing the alarm includes:

a first determining step of determining the fact that said subsequently detected distance decreased below said detected distance;

a second determining step of determining whether a difference between said output signal value obtained from said operation member and said output signal value stored in said memory unit falls within a predetermined range or not in response to a result of the determination at said first determining step; and a step of issuing an alarm based on a result of the determination at said second determining step, wherein said first determining step includes:

a step of setting a reference distance predetermined correspondingly to an arbitrary value of the following distance; and a third determining step of determining, based on said subsequently detected following distance, whether the preceding vehicle passed through a position at the reference distance corresponding to said detected distance, and wherein said first determining step further includes a fourth determining step of determining whether the distance between said preceding and subject vehicles is shorter than said reference distance or not in response to the determination in said third determining means of the fact that the preceding vehicle passed through the position at the reference distance corresponding to said detected distance.

6. The rear-end collision alarming method according to claim 5, wherein said fourth determining step includes:

a step of setting at least one distance detection point related to said detected distance for detecting the distance shorter than the corresponding reference distance, in addition to the point at the reference distance; and a step of determining whether said distance detected by said following distance detector covers said distance detection point related to said detected distance.

* * * * *